United States Patent

Gardam

[11] Patent Number: 5,694,814
[45] Date of Patent: Dec. 9, 1997

[54] CLAMPS PROVIDING A GEOMETRICAL LOCK

[75] Inventor: Allan Gardam, Rhuddlan, United Kingdom

[73] Assignee: Pilkington PE Limited, St. Helens, United Kingdom

[21] Appl. No.: 383,917

[22] Filed: Feb. 6, 1995

[30] Foreign Application Priority Data

Feb. 5, 1994 [GB] United Kingdom ............ 9402223

[51] Int. Cl.$^6$ .................................. G05G 1/04
[52] U.S. Cl. ............... 74/526; 74/813 L; 269/47; 359/818
[58] Field of Search ............... 74/526, 813 L; 269/47, 52, 268, 243; 248/677, 188.8, 425, 346.06; 24/525, 537, 569; 403/373, 385, 338; 359/818, 822

[56] References Cited

U.S. PATENT DOCUMENTS

| | | | |
|---|---|---|---|
| 2,641,965 | 6/1953 | Valenza | 359/818 |
| 3,822,088 | 7/1974 | Steiner | 350/243 |
| 5,328,290 | 7/1994 | Plastina | 403/385 X |
| 5,355,539 | 10/1994 | Boettger | 24/525 X |

FOREIGN PATENT DOCUMENTS 6411631 11/1965 Netherlands ............ 24/525

Primary Examiner—Charles A. Marmor
Assistant Examiner—David M. Fenstermacher
Attorney, Agent, or Firm—F. Eugene Davis, IV

[57] ABSTRACT

A locking arrangement suitable for use in precision optical instruments comprising first and second mountings (56, 58) defining respective opposing first and second concave surfaces (60, 62) and a member (64) for location between the mountings and defining oppositely directed convex surfaces (66, 68) for engaging a respective concave surfaces. A clamping arrangement (72, 74) is provided and has an adjustment configuration in which the member (64) is rotatable about an axis passing through the engaging surfaces and a locking configuration in which, with the first mounting (56) fixed in position and the second mounting (58) fixed against movement along the axis, the surfaces are held in locking engagement.

5 Claims, 1 Drawing Sheet

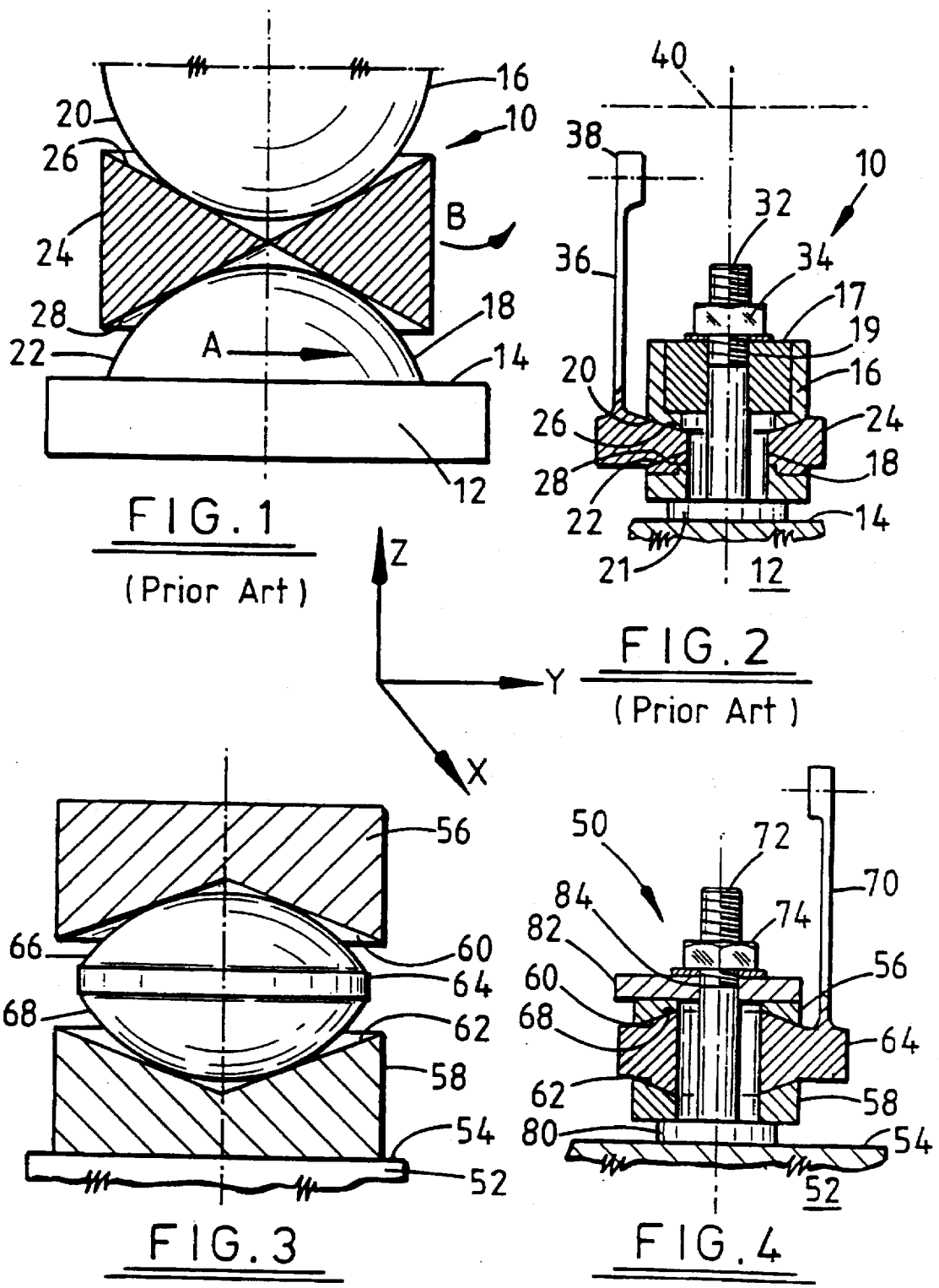

CLAMPS PROVIDING A GEOMETRICAL LOCK

FIELD OF THE INVENTION

This invention relates to a locking arrangement, and in particular, but not exclusively, to a locking arrangement for use in precision optical instruments.

BACKGROUND OF THE INVENTION

When it is desired to provide adjustment, followed by locking, for precision optical instruments the traditional solution has been to mount the component to be adjusted on a member which defines two concave conical surfaces and locate the member between mountings defining opposing part-spherical surfaces. The member and the mountings are located on a fixed stud such that the member can be rotated about the stud then locked in the desired position by clamping the surfaces together by means of a retaining nut. Lateral and transverse adjustment is provided by the upper mounting, the position of which may be varied relative to the stud. In a typical arrangement, after the surfaces have been locked in position, the adjustable upper mounting is fixed to the stud by means of, for example, adhesive. However, a limited degree of lateral movement of the second mounting may still be possible. Thus, if a lateral force is applied to the member the second mounting may be moved laterally, forming a gap between the surface of the member and the lower mounting and allowing displacement to occur.

It is an object of the present invention to obviate or mitigate this disadvantage.

SUMMARY OF THE INVENTION

According to a first aspect of the present invention there is provided a locking arrangement comprising:

first and second mountings defining respective opposing first and second concave surfaces, a member for location between the mountings and defining oppositely directed convex surfaces for engaging a respective concave surface; and a clamping arrangement having an adjustment configuration in which the member is rotatable about an axis passing through said surfaces and a locking configuration in which, with said first mounting fixed in position and said second mounting fixed against movement along said axis, said surfaces are held in locking engagement.

In use, with the clamping arrangement in the locking configuration, the form of the engaging surfaces precludes rotation of the member about a second axis perpendicular to said first axis passing through the surfaces and also precludes linear movement of the member along a third axis perpendicular to said first and second axes, that is there is a geometrical lock between the member and the mountings. Thus, the member, and any component fixed to the member, is positively locked relative to the mountings. The invention has particular application in precision optical instruments. As described above, in existing arrangements the mountings define opposing convex part-spherical surfaces while the member defines concave conical surfaces. With this existing arrangement, if a force is applied to the member, it is possible to rotate the member if there is any lateral movement of one of the mountings; even a small degree of movement of the member may render the optical instrument useless.

Preferably, the concave surfaces are conical and the convex surfaces are part-spherical. It should however be noted that the part-spherical surfaces should not share the same centre, that is define parts of the surface of the same sphere; this would not provide the necessary geometrical lock.

Preferably also, the mountings and the member are located around a fixed pin extending parallel to said first axis from a datum surface, and the first mounting is adapted to be fixed to said pin. Most preferably, the pin is threaded such that a retaining nut may be located thereon to clamp the surfaces together.

Preferably also, the first mounting includes an apertured plate for location over the pin, the aperture being a tight fit on the pin. The location of the aperture may be selected to vary the offset of said first axis to said pin.

Preferably also, a shim is provided to permit adjustment of the spacing of the member from the datum surface. The shim may be provided as a separate component, or the second mounting may incorporate the shim.

According to a further aspect of the present invention there is provided a locking arrangement comprising: first and second mountings defining respective first and second opposing surfaces; a member for location between the mountings and defining oppositely directed surfaces for engaging respective surfaces of the mountings; and a clamping arrangement having an adjustment configuration in which the member is rotatable about a first axis passing through said surfaces and a locking configuration in which said surfaces are held in locking engagement by a compressive force applied along said first axis, the arrangement being such that, in use, with said first mounting fixed in position, said second mounting fixed against movement along said axis, and said clamping arrangement in said locking configuration, said surfaces engage in a manner which precludes rotation of said member about a second axis perpendicular to said first axis and further precludes linear movement of said second mounting along a third axis perpendicular to said first and second axes.

BRIEF DESCRIPTION OF DRAWINGS

These and other aspects of the present will be now be described, by way of example, with reference to the accompanying drawings, in which:

FIG. 1 a schematic sectional view of a prior art locking arrangement;

FIG. 2 is a sectional side view of the prior art arrangement;

FIG. 3 is a schematic sectional view of a locking arrangement in accordance with a preferred embodiment of the present invention; and FIG. 4 is a sectional view of a locking arrangement in accordance with the preferred embodiment of the present invention.

DETAILED DESCRIPTION OF DRAWINGS

Reference is first made to FIG. 1 of the drawings which illustrates, in schematic form, a conventional locking arrangement 10 as provided in precision optical instruments and which is adapted to be fixed relative to a part 12 which defines a fixed datum surface 14. The arrangement 10 includes first and second mountings 16, 18, each of which defines a respective part-spherical surface 20, 22. A member 24 which provides a mounting for a component to be adjusted is located between the mountings 16, 18 and defines oppositely directed concave conical surfaces 26, 28. A stud or pin 32 (FIG. 2) extends upwardly from the part 12 and has a threaded upper end such that a retaining nut 34 (FIG. 2)

may be tightened against the first mounting 16 to clamp the member 24 in the desired position. By loosening the nut, the member 24 may be rotated around the Z-axis.

Adjustment of the member 24 relative to the X and Y axes is achieved by a bushing 17 forming part of the first mounting 16 and which defines an aperture 19 which is a tight fit on the pin 32. The aperture 19 is eccentric or offset to allow movement of the mounting 16 relative to the X and Y axes. To permit the second mounting 18 and member 24 to move, to accommodate this adjustment, the respective internal diameters of the mounting 18 and member 24 are greater than the external diameter of the pin 52.

Adjustment of the member 24 along the Z-axis is achieved by means of an annular shim 21 located over the pin 32 between the datum surface 14 and the second mounting 18.

When the component to be adjusted is in the desired position, the nut 34 may be tightened to secure the member 24 in place, and the upper first mounting 16, which is a tight fit on the pin, is then fixed relative to the pin by means of, for example, adhesive or a further locating pin.

In use, if a lateral force is applied to the member 24 in the direction of the Y-axis, that is from left to right as shown in FIG. 1, this will result in lateral forces being applied to the mountings 16, 18. As noted above, the mounting 16 is fixed to the pin, although it may be possible for the lower second mounting 18 to slide over the surface 14 (arrow A). Such movement of the second mounting 18 may be accommodated by counter-clockwise rotation of the member 24 about the X axis (arrow B) and the member 24 and mounting sliding as a pair between the surfaces 20, 14. Even such a limited amount of movement may render the optical device useless. Further, any lateral movement of the mounting 18 or member 24 results in a sharp drop in the forces holding the member 24 in place.

Reference is now made to FIG. 2 of the drawings which illustrates a device incorporating the arrangement 10. In the interest of brevity, the same reference numerals are used in FIG. 2 to indicate the components of the arrangement described in FIG. 1. FIG. 2 shows the fixed pin 32 and the retaining nut 34, and it will also be noted that the member 24 includes an arm 36 which provides the mounting location 38 adjacent the optical axis 40 on which the component fixed to the member 24 will be aligned.

Reference is now made to FIGS. 3 and 4 of the drawings, which illustrate a locking arrangement in accordance with an embodiment of the present invention, FIG. 3 illustrating the arrangement schematically. The arrangement 50 is located on a fixed component part 52 defining a datum surface 54 and includes first and second mountings 56, 58 which define respective first and second opposing concave conical surfaces 60, 62. Located between the mountings 56, 58 is a member 64 which defines oppositely directed part-spherical surfaces 66, 68. As illustrated in FIG. 4, the mountings 56, 58 and member 64 are located over a fixed pin 72 and held on the pin by a nut 74 which engages the threaded upper end of the pin. FIG. 4 also illustrates the arm 70 of the member 24 which provides a mounting location for a component of an optical device.

Adjustment of the member 64 along the Z-axis is achieved by means of a shim 80 located between the datum surface 54 and the lower surface of the mounting 58. Adjustment of the member 64 relative to the X and Y axes is provided by a plate 82 to which the first mounting 56 is fixed. As may been seen in FIG. 4, the plate is apertured at 84 and the location, or eccentricity, of the aperture is selected to achieve the appropriate positioning relative to the X and Y axes, the aperture 84 being a tight fit on the pin 72.

Rotational adjustment about the Z-axis is achieved by loosening the nut 74 and rotating the member 64 relative to the mountings 56, 58. When the desired position is achieved, the nut 74 is tightened to clamp the member 64 between the surfaces 60, 62. Once this final adjustment has been made the plate 82 and upper first mounting 56 are fixed relative to the pin 72 by means of adhesive.

Once the arrangement 50 has been set, in the event of a force being applied to the member 64, for example, in the direction of the Y-axis, there is no possibility of movement of the member 64 relative to the fixed part 52 and the fixed mounting 56; any movement of the member 64, whether a lateral movement in the direction of the Y-axis or a rotation about the X-axis, requires the surfaces 60, 62 of the mounting 56, 58 to be moved apart and such movement is prevented by the clamping action of the nut 74. In other words, the configuration of the surfaces 60, 62, 66, 68 provides a geometrical lock as there is only one, unique relative position of the member 64 and the mounting 58 which will be accommodated in the space between the surface 60 of the mounting 56 and the upper surface of the shim 80. Thus, movement of the member 64 will tend to increase the forces holding the member 64 in place.

It will be clear to those of skill in the art that the above described embodiment is merely exemplary of the present invention and that various modifications and improvements may be made thereto without departing from the scope of the present invention.

I claim:

1. A locking clamp comprising:

first and second mountings defining respective opposing first and second frusto-conical concave surfaces;

a member for location between the mountings and defining oppositely directed part-spherical convex surfaces for engaging a respective concave surface and wherein said part-spherical convex surfaces do not share the same center; and having an adjustment configuration in which the member is rotatable about a first axis passing through said surfaces and a locking configuration in which, with said first mounting fixed in position and said second mounting fixed against movement along said axis, said surfaces are held in locking engagement.

2. The locking clamp as claimed in claim 1 wherein the mountings and the member are located on a fixed pin extending parallel to said first axis from a datum surface, and the first mounting is adapted to be fixed to said pin.

3. The locking clamp of claim 2 wherein the pin is threaded to engage a retaining nut to clamp the surfaces together.

4. The locking clamp of claim 2 wherein the first mounting includes an apertured plate for location over the pin, the aperture being a tight fit on the pin, the location of the aperture being selected to vary the offset of said first axis to said pin.

5. The locking clamp of claim 2 wherein a shim is provided to permit adjustment of the spacing of the member from the datum surface.

* * * * *